United States Patent
Steeves

(10) Patent No.: US 6,570,487 B1
(45) Date of Patent: May 27, 2003

(54) DISTRIBUTED TAG READER SYSTEM AND METHOD

(75) Inventor: Wayne E. Steeves, Plano, TX (US)

(73) Assignee: Axcess Inc., Carrollton, TX (US)

( * ) Notice: Subject to any disclaimer, the term of this patent is extended or adjusted under 35 U.S.C. 154(b) by 0 days.

(21) Appl. No.: 09/298,982

(22) Filed: Apr. 22, 1999

Related U.S. Application Data

(63) Continuation-in-part of application No. 08/789,148, filed on Jan. 24, 1997, now Pat. No. 6,034,603.

(51) Int. Cl.$^7$ .............................. H04Q 1/00; G05B 19/00
(52) U.S. Cl. ...................... 340/5.2; 340/572.1; 340/5.61
(58) Field of Search ............................... 340/5.2, 8, 81, 340/5.61, 5.33, 5.26, 10.1, 5, 10.51, 10.2, 572.1, 572.7, 573.4, 505; 713/200; 141/94; 342/44, 442; 307/10.5

(56) References Cited

U.S. PATENT DOCUMENTS

| | | | |
|---|---|---|---|
| 4,217,588 A | 8/1980 | Freeny, Jr. ................ | 343/112 |
| 4,303,910 A | 12/1981 | McCann .................... | 340/572 |
| 4,385,231 A * | 5/1983 | Mizutani et al. ........... | 235/382 |
| 4,459,474 A | 7/1984 | Walton ...................... | 235/380 |
| 4,471,345 A | 9/1984 | Barrett, Jr. ................. | 340/572 |
| 4,528,663 A | 7/1985 | Citta ......................... | 370/94 |
| 4,598,275 A | 7/1986 | Ross et al. ................. | 340/573 |
| 4,654,793 A | 3/1987 | Elrod ........................ | 364/401 |
| 4,691,202 A | 9/1987 | Denne et al. ........... | 340/825.54 |
| 4,822,990 A | 4/1989 | Tamada et al. ............ | 235/492 |
| 4,833,807 A | 5/1989 | McLean ..................... | 40/633 |
| 4,862,160 A | 8/1989 | Ekchian et al. ........ | 340/825.54 |
| 4,864,292 A * | 9/1989 | Nieuwkoop ................ | 340/10.1 |
| 4,955,038 A | 9/1990 | Lee et al. ..................... | 375/35 |
| 5,006,983 A | 4/1991 | Wayne et al. ............... | 364/401 |
| 5,051,741 A | 9/1991 | Wesby ...................... | 340/824 |
| 5,153,878 A | 10/1992 | Krebs ....................... | 370/95.1 |
| 5,175,729 A | 12/1992 | Borras et al. ................ | 370/79 |
| 5,220,557 A | 6/1993 | Kelley ........................ | 370/50 |

(List continued on next page.)

FOREIGN PATENT DOCUMENTS

| | | | |
|---|---|---|---|
| BE | 1006392 A3 | 8/1994 | |
| DE | 298 15 797 U1 | 10/1998 | ......... G08B/13/196 |
| EP | 0 161 779 A1 | 11/1985 | |
| EP | 0 245 555 A1 | 11/1987 | |
| EP | 0 467 036 A2 | 1/1992 | |
| EP | 0 565 046 A2 | 10/1993 | |
| GB | 2187317 A | 9/1987 | ............. G07C/1/20 |
| GB | 2 307 324 A | 5/1997 | ............ G07C/11/00 |
| WO | WO 91/17515 | 11/1991 | |
| WO | WO 93/04537 | 3/1993 | |
| WO | WO 95/12858 | 5/1995 | ......... G06F/153/00 |
| WO | WO 98/10358 | 3/1998 | ............ G06F/17/30 |
| WO | WO 98/11520 | 3/1998 | ............ G08B/13/14 |

OTHER PUBLICATIONS

International Search Report in PCT International Application No. PCT/US 00/ 33569, dated Apr. 5, 2001.

International Search Report in PCT International Application No. PCT/US00/42802, dated May, 18, 2001.

PCT Written Opinion in PCT International Application No. PCT/US00/42802, dated Apr. 8, 2002.

(List continued on next page.)

*Primary Examiner*—Michael Horabik
*Assistant Examiner*—William Bangachon
(74) *Attorney, Agent, or Firm*—Baker Botts LLP

(57) ABSTRACT

An access control system includes a plurality of door control systems each associated with an access door and including a relay control for operating the access door and a transmitter for eliciting a radio response from a tag at the access door. The response includes a tag ID and an access door ID. A receiver is operable to receive radio responses from tags at a plurality of access doors. An access door controller is coupled to the receiver and operable to receive the tag ID and the access door ID included in each radio response received by the receiver. The access controller determines whether access by the tag at the access door is authorized and controls the relay door to permit authorized access.

26 Claims, 5 Drawing Sheets

U.S. PATENT DOCUMENTS

| | | |
|---|---|---|
| 5,227,803 A | 7/1993 | O'Connor et al. ............ 342/442 |
| 5,266,925 A | 11/1993 | Vercellotti et al. ........... 340/572 |
| 5,272,476 A | 12/1993 | McArthur et al. ...... 340/870.13 |
| 5,287,269 A | 2/1994 | Dorrough et al. ............ 364/408 |
| 5,289,369 A | 2/1994 | Hirshberg .................... 364/401 |
| 5,305,008 A | 4/1994 | Turner et al. .................. 342/44 |
| 5,321,396 A | 6/1994 | Lamming et al. ....... 340/825.49 |
| 5,351,052 A | 9/1994 | D'Hont et al. ................. 342/42 |
| 5,371,899 A | 12/1994 | Kuznicki et al. ........... 455/34.1 |
| 5,423,574 A | 6/1995 | Forte-Pathroff .............. 283/75 |
| 5,425,032 A | 6/1995 | Shloss et al. ............... 370/95.2 |
| 5,432,864 A | 7/1995 | Lu et al. ...................... 382/118 |
| 5,448,242 A | 9/1995 | Sharpe et al. .................. 342/42 |
| 5,450,087 A | 9/1995 | Hurta et al. ................... 342/42 |
| 5,453,747 A | 9/1995 | D'Hont et al. ................. 342/42 |
| 5,471,212 A | 11/1995 | Sharpe et al. .................. 342/51 |
| 5,488,376 A | 1/1996 | Hurta et al. ................... 342/42 |
| 5,491,471 A * | 2/1996 | Stobbe ....................... 340/5.61 |
| 5,502,806 A | 3/1996 | Mahoney et al. ............ 395/161 |
| 5,523,737 A | 6/1996 | Luna ............................ 340/323 |
| 5,525,992 A | 6/1996 | Froschermeier .............. 342/42 |
| 5,525,994 A | 6/1996 | Hurta et al. ................... 342/51 |
| 5,539,394 A | 7/1996 | Cato et al. ............. 340/825.54 |
| 5,541,928 A | 7/1996 | Kobayashi et al. ......... 370/95.1 |
| 5,581,297 A | 12/1996 | Koz et al. .................... 348/152 |
| 5,621,412 A | 4/1997 | Sharpe et al. .................. 342/51 |
| 5,640,151 A | 6/1997 | Reis et al. ............. 340/825.54 |
| 5,668,803 A | 9/1997 | Tymes et al. ................ 370/312 |
| 5,686,902 A | 11/1997 | Reis et al. ............. 340/825.54 |
| 5,689,442 A | 11/1997 | Swanson et al. ............ 364/550 |
| 5,721,733 A | 2/1998 | Wang et al. ................. 370/332 |
| 5,737,330 A | 4/1998 | Fulthorp et al. ............. 370/346 |
| 5,745,037 A | 4/1998 | Guthrie et al. ............... 340/573 |
| 5,754,541 A | 5/1998 | Glisic et al. ................. 370/335 |
| 5,774,459 A | 6/1998 | Charrat ........................ 370/310 |
| 5,805,082 A | 9/1998 | Hassett ........................ 235/384 |
| 5,808,587 A | 9/1998 | Shima .......................... 343/895 |
| 5,837,982 A | 11/1998 | Fujioka ....................... 235/382 |
| D403,392 S | 12/1998 | Briggs et al. .............. D21/814 |
| D406,871 S | 3/1999 | Briggs ........................ D21/811 |
| D407,133 S | 3/1999 | Briggs ........................ D21/826 |
| 5,892,454 A | 4/1999 | Schipper et al. ........ 340/825.37 |
| 5,956,259 A | 9/1999 | Hartsell, Jr. et al. .... 364/528.37 |

OTHER PUBLICATIONS

U.S. patent application Ser. No. 09/258,974, "High Sensitivity Demodulator for a Radio Tag and Method," filed by Wayne E. Steeves, Feb. 26, 1999.

"Radio Frequency Identification (RFID)—Standards, Common Applications, A Look Ahead, and Recommended Reading," http://www.aimglobal.org/techinfo/rfid/rfidintro.html, 4 pgs., Printed Jun. 7, 1999.

AIM International, Inc., "Radio Frequency Identification RFID—A Glossary: AIM International WP–98/001R," http://www.aimglobal.org/techinfo/rfid/aimrfidglossary.html, Printed Jun. 7, 1999.

AIM International, Inc., "Radio Frequency Identification RFID—A Basic Primer: AIM International WP–98/002R," http://www.aimglobal.org/techinfo/rfid/aimrfidbasics.html, Printed Jun. 7, 1999.

* cited by examiner

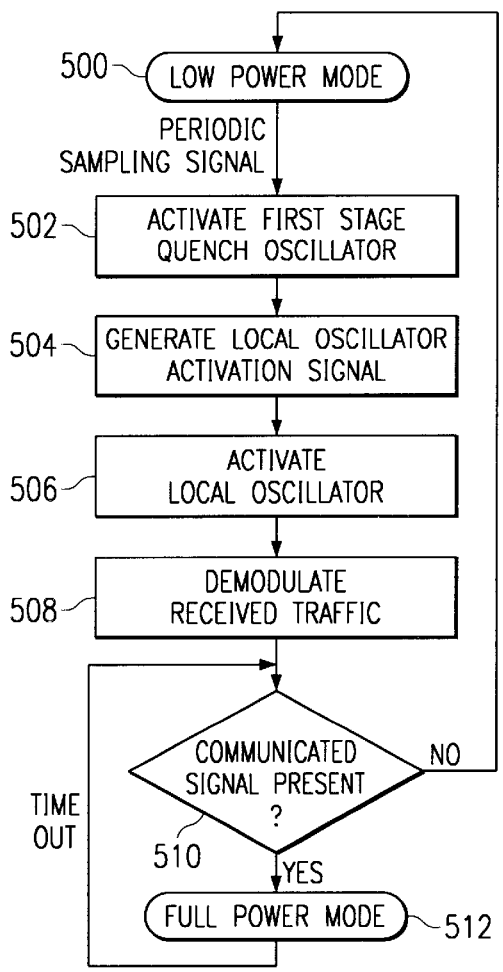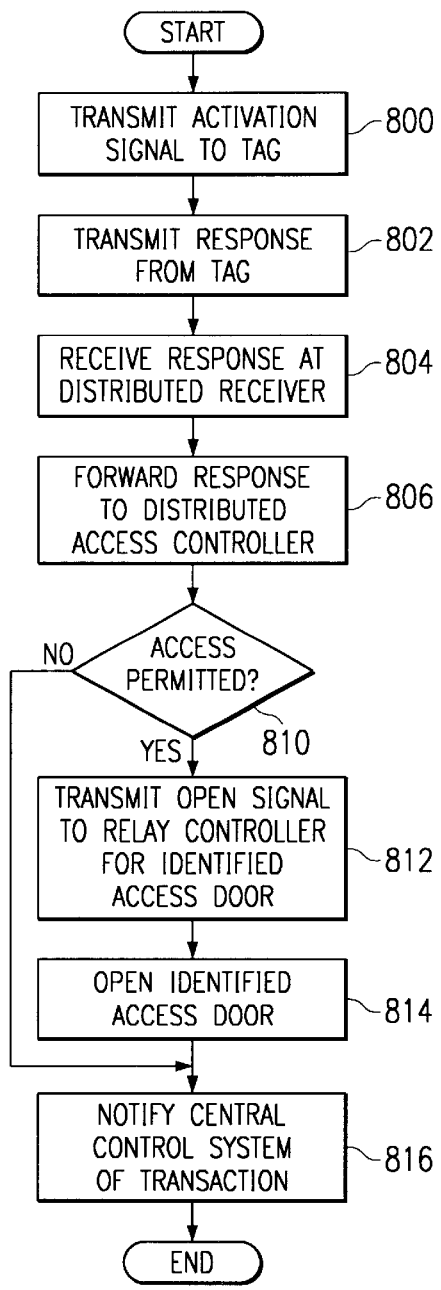

DISTRIBUTED TAG READER SYSTEM AND METHOD

CROSS REFERENCE TO RELATED APPLICATIONS

This application is a continuation-in-part of U.S. application Ser. No. 08/789,148 filed on Jan. 24, 1997, now U.S. Pat. No. 6,034,603.

TECHNICAL FIELD OF THE INVENTION

This invention relates generally to radio frequency identification (RFID) systems and methods, and more particularly to a distributed tag reader system and method.

BACKGROUND OF THE INVENTION

The management and tracking of personnel, assets, and other objects is required in a wide variety of environments, and is often cumbersome, labor intensive, and expensive. Radio receivers and transmitters have been used for many years to identify personnel and objects in such environments. For example, many systems are known for attaching radio tags to items, such as automobiles, so that when automobiles equipped with radio tags enter a certain area, such as a toll booth area, the automobiles are automatically identified and the appropriate tolls are deducted from corresponding accounts, thereby obviating the need for drivers to stop and make payment at toll booths. Innumerable other applications for such radio tag systems have been identified, in areas ranging from inventory control to facility security to sporting event timing.

For security and other access control systems, each access door is typically controlled by a reader system. The reader system typically includes at each door a local transmitter to activate a tag, a receiver to receive and process a response from the tag, and an actuator to control the access door. The reader system is connected to a central controller that determines whether requested access is permitted. Such access control and security systems are expensive to implement due to the equipment needed at each access door. In addition, securing an additional door requires full implementation of a reader system at the access door.

SUMMARY OF THE INVENTION

The present invention provides a distributed tag reader system and method that substantially reduce or eliminate disadvantages and problems associated with previously developed systems and methods. In particular, reader functionality is distributed and shared at the receiver and access control levels to improve efficiency and system robustness.

In accordance with one embodiment of the present invention, an access control system includes a plurality of door control systems each associated with an access door and including a relay control for operating the access door and a transmitter for eliciting a radio response from a tag at the access door. The response includes a tag ID and an access door ID. A receiver is operable to receive radio responses from tags at a plurality of access doors. An access door controller is coupled to the receiver and operable to receive the tag ID and the access door ID included in each radio response received by the receiver. The access controller determines whether access by the tag at the access door is authorized and controls the relay door to permit authorized access.

More specifically, in accordance with a particular embodiment of the present invention, the access control system includes a plurality of access controllers, each remote from each other. The access controllers are each coupled to at least one receiver and operable to receive the tag ID and the access door ID included in each radio response received by the receiver, determine whether access by the tag at the access door is authorized, and control the relay control to permit authorized access. An application program interface is coupled to the access controllers and operable to log actions taken by the access controllers.

Technical advantages of the present invention include providing a improved tag reader system and method. In particular, reader functionality is distributed between door control systems, receivers, and access controllers. Receivers are shared by a plurality of access doors to reduce system cost. Access controllers are shared by receivers to further reduce system cost. Receiver ranges may overlap to provide backup processing, thus eliminating the need for duplicate systems at each access door.

Another technical advantage of the present invention includes providing modular components that may be inserted and used at any level in the distributed system and shared between remote units. In particular, memory, processor, communication and other suitable modules are each configured to operate independently of the other. As a result, each component or module may be subtracted or added at any level of system operation.

Other technical advantages of the present invention will be readily apparent to one skilled in the art from the following figures, description, and claims.

BRIEF DESCRIPTION OF THE DRAWINGS

FIG. 6 is a flow diagram illustrating operation of the receiver in low and full power modes;

FIG. 8 is a flow diagram illustrating a method for controlling access to a facility in accordance with one embodiment of the present invention.

DETAILED DESCRIPTION OF THE INVENTION

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
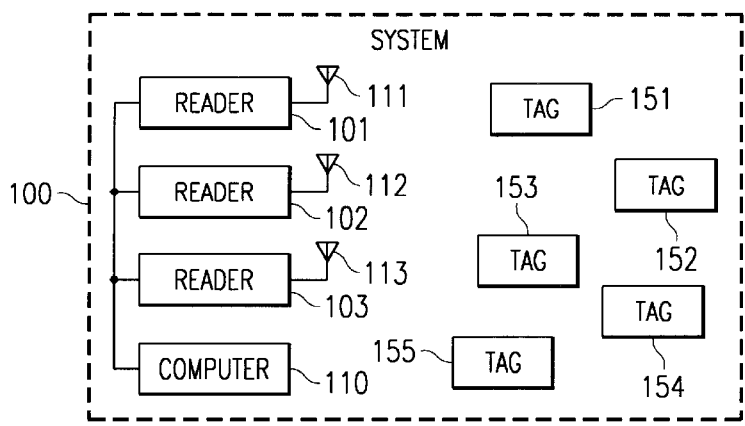
FIG. 1 is a block diagram illustrating a system for data transmission in accordance with one embodiment of the present invention.

Referring now to FIG. 1, there is shown a system 100 in accordance with the present invention. The operation of the system 100 is illustrated by discussion of the component parts illustrated in FIG. 1. In the embodiment of system 100 illustrated in FIG. 1, three readers 101 103, each with respective antennas 111–113, communicate with radio tags 151–155. As described in greater detail below, computer 110 connected to readers 101–103 directs the transmission of signals from readers 101–103 to tags 151–155 and processes data received by readers 101–103. Readers 101–103 communicate with computer 110 via a media independent control network such as LonWorks® (a registered trademark of Echelon, Inc.). Computer 110 contains applications level software that commands the readers to interrogate in accordance with the desired application of the present invention. Each reader 101–103 is individually addressed by computer 110 using industry standard control network protocols or, in the case of an RF interconnection scheme, the collision avoidance techniques of the present invention are utilized.

In a preferred embodiment, computer 110 is connected to readers 101–103 using conventional industry standard physical connections, e.g., under the industry standard EIA232 or EIA485 protocols. The application software running on computer 110 communicates via the physical connections using conventional ASCII command syntax. For example, in a preferred embodiment commands issued by computer 110 to readers 101–103 take therefrom of a packet in C language syntax, such as:

| struct Tag Command { | |
|---|---|
| char ReaderID; | [\]Reader ID # or Reader Group ID to respond |
| char TagID; | [\]Tag ID or grouping to search for |
| char TagInfo; | [\]Portion of tag data to interrogate |
| char Command; | [\]Command: i.e. Program tags, Locate tag, Follow tag |
| } | |

Other formats, e.g., a single line non-structured command syntax, could also be employed in other embodiments, as needed for any particular application.

It should be readily apparent that the embodiment illustrated in FIG. 1 is merely exemplary of a system in accordance with the present invention, and that other embodiments using, for instance, different numbers of readers and tags, could be employed as needed in any particular application.

In systems including numerous tags and readers, some provision must be made for the possibility that more than one tag may, at any particular time, seek to transmit an identification signal. So-called "single-read" RFID systems force the readers, or the tags, or both, to be spaced in a manner that only one tag is within range of any particular reader at any given time. Known "multiple-read" systems seek to ameliorate interference through randomized time delay of data tag signal transmissions after an inquiry signal sent by a reader or through repetitive transmission of data tag signals. An unfortunate result of such techniques is that significant signal bandwidth is wasted, either by being unused during such randomized waiting periods or by repetitive transmission of the same data.

In contrast, system 100 uses improved techniques for avoiding collisions among tag signals, for detecting such collisions, and for reconstructing data packets affected by such collisions. In the operation of system 100 a tag, e.g., 151, remains in a low-power quiescent stand-by state until activated by a signal from a reader, e.g., 101. Following transmission of the activation signal, the reader sends a request for information, in essence polling any activated tags within range. A receiving tag determines whether the requested information is relevant to that tag. If not, the tag returns to its quiescent stand-by state. If the request is relevant, the tag transmits the requested information to the reader as detailed herein.

Figure 2:
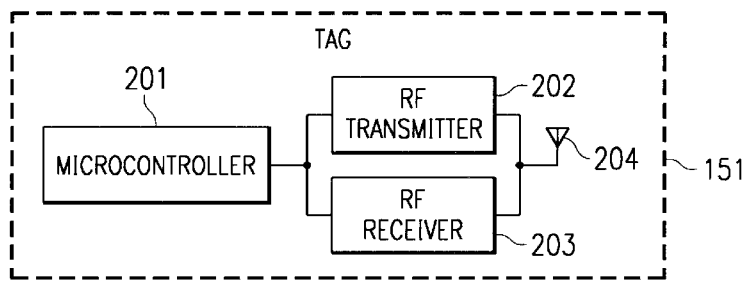
FIG. 2 is a block diagram illustrating a radio tag in accordance with one embodiment of the present invention.

Referring now also to FIG. 2, a tag, e.g., 151, includes a microcontroller 201, an RF transmitter 202, an RF receiver 203, and an antenna 204. In a preferred embodiment, microcontroller 201 is implemented using a conventional model MC143120 microcontroller chip available from Motorola, Inc. (in alternative embodiments other microcontrollers, such as a model COP842 microcontroller chip from National Semiconductor, Inc., may be used), RF transmitter 202 is implemented using a conventional transmitter circuit such as model NT315TX available from Axcess, Inc.; and antenna 204 is implemented using a conventional antenna with conventional switching circuitry allowing use of antenna 204 with both transmitter 202 and receiver 203. It should be recognized that other components could be used in alternate embodiments. RF receiver 203 is, in a preferred embodiment, implemented by a modified superregenerative receiver circuit whereby the quench frequency is varied to provide quiescent operation with a current draw in a quiescent stand-by state of less than 2 microamps, further described below.

Figure 4:
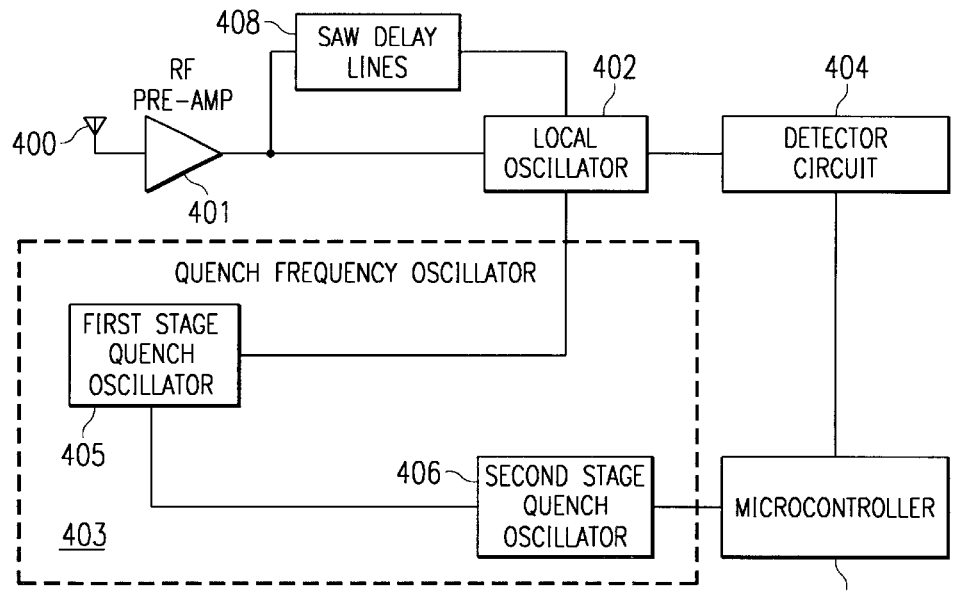
FIG. 4 is a block diagram illustrating a low power receiver for a radio tag in accordance with one embodiment of the present invention.

Referring now to FIG. 4, power control functions of superregenerative receiver, e.g., 203, permit some of the elements of receiver 203 to be completely shut down to save tag power while operating in a quiescent state. Conventional superregenerative receiver designs include a front end amplification stage, a local oscillator operating at the center frequency, a quench frequency oscillator operating with a duty cycle of at least 10 times the data rate, and a detector circuit. The modified design of the present invention includes the amplification stage 401, the local oscillator 402, quench frequency source 403, and a detector stage 404 as in conventional designs. Conventional designs utilize typical forward-biased transistor stages configured as amplifiers. The present invention utilizes the same method of amplification except that forward biasing is provided by the quench frequency such that power draw is limited to 50% of the normal 100% biasing techniques due to the 50% duty cycle of the quench. Amplifier power 401, is limited to leakage currents only (generally less than 500 nanoamps) when the quench frequency is shut down.

Additionally, the local oscillator (LO) in conventional designs is controlled by the quench frequency such that it is turned off prior to achieving stable oscillation. In this way, the RF is sampled as the LO is able to achieve stable oscillation significantly faster in the presence of an RF signal than without an RF signal. The detector circuit simply filters out the quench and LO frequencies (low pass filters) leaving the pulse created by the increased size of the RF envelope with RF present.

Since the LO 402 is also turned on and off by the quench frequency, power can also be controlled in the same way as the front end amplifier 401 biasing described above. A Surface Acoustic Wave (SAW) Delay Line 408 (in a preferred embodiment model no. SL1011 from RF Monolithics, and in alternate embodiments any of the SLXXXX series of devices or equivalents) provides stability to the LO frequency and inserts the proper timing for signal reception 400, amplification 401, and quench 403 sampling of the LO 402.

Figure 5:
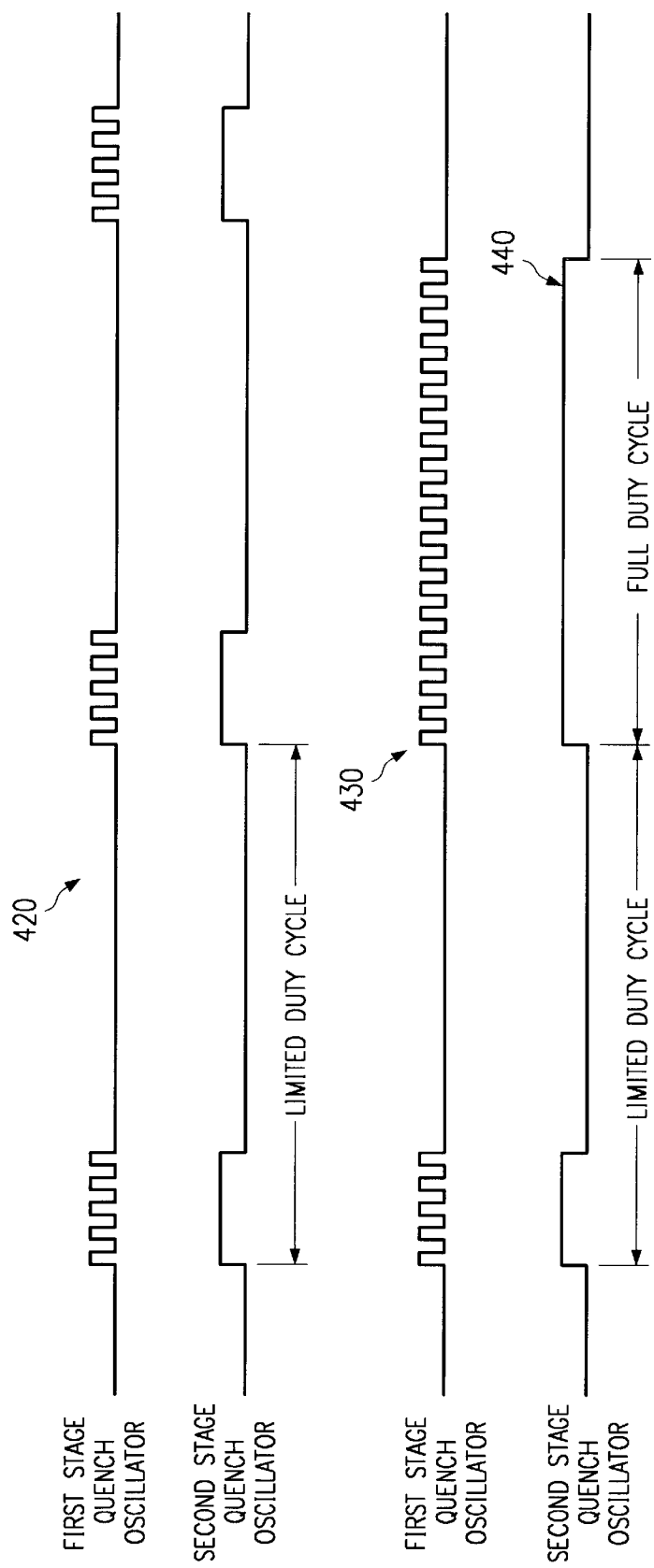
FIG. 5 is a timing diagram illustrating first and second stage quench frequency oscillator outputs in accordance with one embodiment of the present invention.

In the configuration illustrated in FIG. 4, the quench frequency oscillator 403 actually consists of two separate oscillators, first and second stage quench oscillators 405 and 406, that operate in one of two modes and that are referred to as quench oscillator full power mode and quench oscillator low power mode. In low power quiescent mode, the oscillator 403 outputs a quench signal 420 as in FIG. 5. A duty cycle of 1 to 5% over a period of 10 ms provides sufficient time for reception of a 20 to 30 ms activation signal and reduces total circuit draw by as much as 99%. The high pulse consists of a 30 to 500 khz 50% duty cycle trapezoidal pulse train for normal quenching of the local oscillator 402. When a signal is detected, microcontroller 407 turns off the low duty cycle such that the 50% 30 to 500 khz normal quench frequency signal 430 is maintained for normal data retrieval.

Referring again to FIG. 4, the detector circuit 404 is a micropower diode/comparator arrangement, although other more efficient types of detectors can be implemented in alternate embodiments as long as the power requirement is 1 microamp or less to minimize the total circuit power requirement. The detector circuit 404 illustrated in FIG. 4 is typical of superregenerative and other receiver designs, with low power consumption being achieved through use of conventional low power componentry, e.g., in a preferred embodiment a model MAX417 dual op-amp device from Maxim (not shown). In a preferred embodiment, detector circuit 404 operates as follows: The output of quench frequency oscillator 403, as integrated with the local oscillator 402, is first passed through a low pass filter (not shown) and applied to the first op-amp of the Maxim device to amplify the resulting signal sufficiently to be applied to the second op-amp of the Maxim device, which is configured as a comparator creating a data pulse from detector circuit 404 when triggered. This data pulse is then applied to microcontroller 407 to indicate that quench frequency oscillator 403 should be placed in full power mode by setting the second stage quench oscillator output to a stable high output state 440.

FIG. 6 is a flow diagram illustrating operation of the superregenerative receiver 203 in accordance with one embodiment of the present invention. In this embodiment, the quench frequency oscillator 403 comprises the first stage quench oscillator 405 and the separate, second stage quench oscillator 406. The first stage quench oscillator 405 is coupled to the local oscillator 402 and operable, when active, to activate the local oscillator 402. The second stage quench oscillator 406 is coupled to the first stage quench oscillator 405 and operable in a low power mode to periodically activate the first stage quench oscillator 405 in order to periodically activate the local oscillator 402 for the purpose of detecting the presence of a communicated signal and in a full power mode to continuously activate the first stage quench oscillator in order to continuously activate the local oscillator 402 for the purpose of collecting the communicated signal. When continuously activated, the local oscillator 402 and first stage quench oscillator 405 may each have a fifty percent or other suitable duty cycle for full or desired sensitivity reception. The communicated signal is a signal communicated to the tag 151. The communicated signal may be an ultra high frequency (UHF) or other suitable signal. It will be understood that the quench oscillator 402 may instead be a dual quench oscillator and that the receiver may comprise other types of suitable receivers operating on a limited power supply, such as a coin cell battery, and may include other suitable circuits and components.

Referring to FIG. 6, the method begins at state 500 in which the quench oscillator 403, and thus the receiver 203, is in the low power mode. The tag 151 is in sleep or stand-by mode. In the low power mode, the receiver 203 preferably uses only leakage current from a battery for the tag 151. For a tag 151 operating on a typical lithium coin cell battery, for example, the receiver 203 in the low power mode uses 500 nanoamps or less power. As a result, the receiver 203 need not use active current from the battery, and life of the battery and the tag 151 are extended.

In the low power mode, the second stage quench oscillator 406 has a low duty cycle that periodically generates a first stage activation, or sampling, signal to detect whether a signal is present. The duty cycle may be less than five percent and in the preferred embodiment is about one percent. The duty cycle should be sufficient to enable sampling of traffic being received such that the presence of signals can be detected while minimizing power consumption.

In response to the periodic sampling signal, state 500 transitions to step 502 in which the first stage quench oscillator 405 is activated by the sampling signal. In a particular embodiment, the first stage quench oscillator 405 is active only in the presence of the sampling signal. Thus, the first stage quench oscillator 405 will activate based on the duty cycle of the second stage quench oscillator 406.

Proceeding to step 504, the first stage quench oscillator 405 generates a local oscillator activation signal. At step 506, the local oscillator 402 is activated in response to the activation signal from the first stage quench oscillator 405. In a particular embodiment, the local oscillator 402 is acting only in the presence of the local oscillator activation signal. Thus, in the low power mode, the local oscillator 402 will activate based on the duty cycle of the second stage quench oscillator 406.

Next, at step 508, the local oscillator 402 demodulates received traffic to generate a demodulated signal. The local oscillator 402 demodulates received traffic at a specified frequency. The communicated signals are traffic modulated at that specified frequency.

Proceeding to decisional step 510, the detector 404, in combination with the microcontroller 407, determines whether a communicated signal is present in the demodulated signal output by the local oscillator 402. If a communicated signal is not present, the tag 151 may return to stand-by, or sleep mode. Accordingly, the No branch of decisional step 510 returns to the low power mode at state 500 in which the second stage quench oscillator 406 remains at the low duty cycle to minimize power consumption.

Returning to decisional step 510, if a communicated signal is present in the demodulated signal, the communicated signal needs to be collected and the Yes branch of decisional step 510 leads to state 512. At state 512, the second stage quench oscillator 406, and thus the quench oscillator 403 and the receiver 203, transition to full power mode. In the full power mode, the second stage quench oscillator 406 has a full duty cycle to continuously activate the first stage quench oscillator 405. In response, the first stage quench oscillator 405 continuously activates the local oscillator 402 for full sensitivity reception and the communicated signal is demodulated and collected. Accordingly, full power is used only when a communicated signal is present and needs to be collected.

The receiver 203 remains at state 512 until the communicated signal has been fully received. After complete reception of the communicated signal, in response to a timeout or other suitable event, state 512 returns to decisional step 512 in which it is determined if another communicated signal is present. If a communicated signal is present and being received, the receiver 203 is returned to state 512 and remains in full power mode at least until the communicated signal is fully collected. Following collection of the communicated signal, and the absence of a further communicated signal, the No branch of decisional step 510 returns to state 500 in which the second stage quench oscillator 406, and thus the receiver 203, are in the low power mode. Accordingly, the receiver 203 is maintained in full power mode only as long as necessary to collect a communicated signal and, if desired, for a short period thereafter. In this way, by using a second mode of operation or a second quench oscillator, at a substantially lower frequency, substantial power savings are realized. In the low power mode, sampling the radio frequency takes place at a duty cycle that is conducive to long battery life. Once a radio frequency input signal is detected, the higher frequency quench is turned on and full sensitivity is achieved. This could all be timed such that the full turn on of the unit is accomplished during transmission of a preamble from the transmitting device. The microcontroller 407 provides binary outputs to control the mode of operation. The controller 407 operates in a low power sleep state until the pulse from the low power, low duty cycle quench is detected via some incoming radio frequency and is awakened. The controller 407 then immediately upon awakening turns off the low duty cycle mode and turns on the normal quench frequency controller and searches for valid radio frequency pulses for demodulation. Once the pulses have stopped for some period, the controller 407 turns off normal quench, turns on low power quench and goes back to low power sleep mode.

Referring again to FIG. 2, in a preferred embodiment, frequency modulation using conventional frequency-shift keying is employed for data transmission, as such transmission is found to provide good selectivity and noise immunity. Microcontroller 201 is conventionally programmed to provide the logic for the functionality described herein, and is coupled to receiver 203 to provide receiver sensitivity and power control via the quench oscillator 403.

Figure 3:
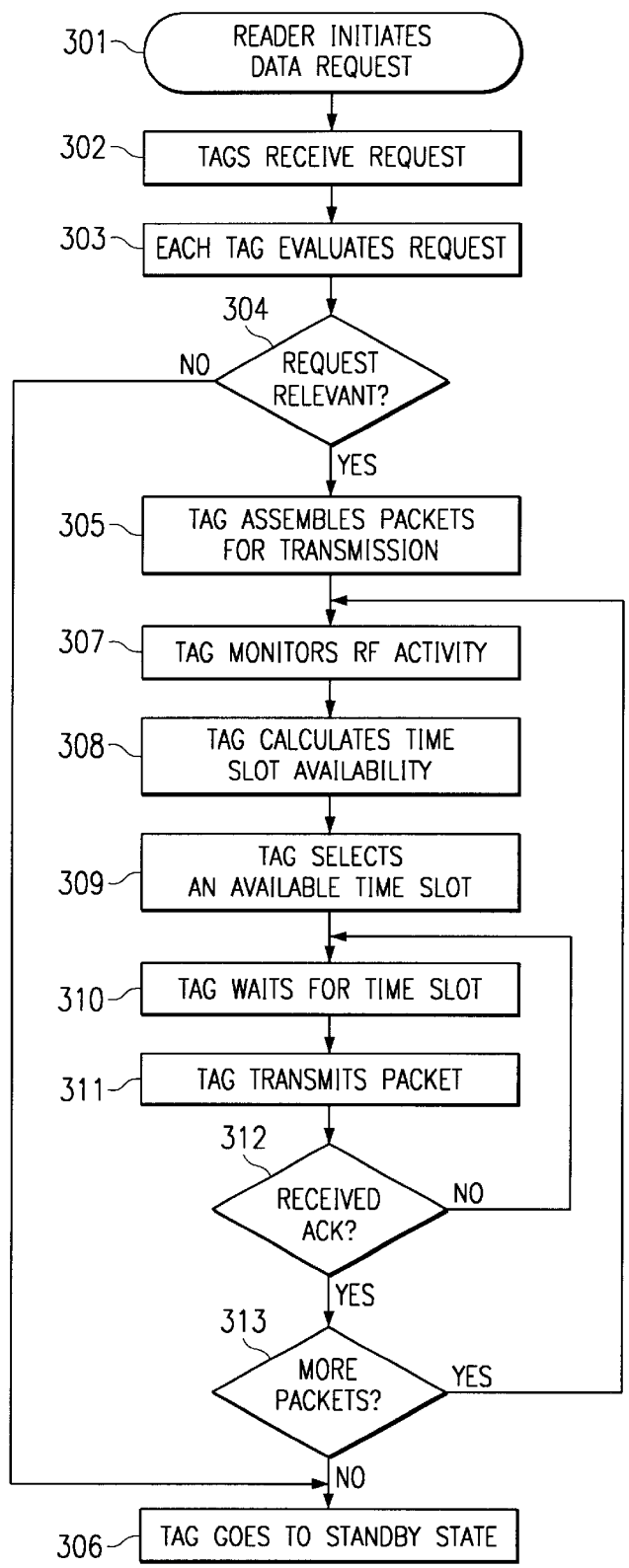
FIG. 3 is a flow diagram illustrating a method for transmitting information between a tag and a reader in accordance with one embodiment of the present invention.

Referring now also to FIG. 3, there is shown a flow diagram illustrating the logic used for implementation of processing for tag 151. Tag 151 is normally in a low-power quiescent stand-by state in which tag 151 monitors the RF environment for an activation signal from a reader, e.g., 101. A reader initiates 301 a request for tag data by transmitting such an activation signal, followed by a request for data. The activation signal is received 302 by all tags within range of the transmitting reader, and causes each such tag to change from quiescent stand-by state to an active state. Once in active state, the tags evaluate 303 the request sent by the reader.

In a preferred embodiment, the activation signal is a modulated waveform with a preamble and a unique reader ID number. Modulation is pulse width using conventional continuous wave (CW), i.e., unmodulated, signal at the center frequency to which the RF receiver 203 is tuned.

In a preferred embodiment, a reader transmits a request that is directed to a single tag, to a subset of tags, or to any tag within range as directed by computer 110. Based on the nature of the request, each active tag makes a determination 304 as to whether the request is relevant to that tag. If not, the tag returns 306 to quiescent stand-by state.

If the request is relevant, the tag assembles 305 a packet of data, including a tag identification number and, depending on the nature of the request from the reader, other relevant information. For example, in one application the request may be for all tags corresponding to fresh food crates to identify themselves and to transmit their preprogrammed expiration dates. If the requested data are voluminous, in a preferred embodiment the data are formed into several packets for individual transmission. In practice it is found that fewer collisions occur by transmitting several smaller packets than one large packet.

Once the tag has assembled one or more packets of data, the tag receiver, e.g., 203, monitors 307 the RF traffic on the transmission channel to determine whether many other tags are responding. Based on the amount of other traffic, or noise, in the RF environment, the tag calculates 308 time slot availability for transmission of its data. In a preferred environment, the time slot availability includes a random component and is determined based upon packet size and the level of RF traffic being generated by other tags. The preprogrammed data rate and the amount of RF traffic determines the time the tag will spend determining slot availability.

The duration of a time slot is determined by dividing the tag data packet size by the fixed data rate of the tag. In a preferred embodiment, a data rate of 20 k bits per second is employed with a packet size of 200 bits, making the time slots (i.e., cycle duration) equal to 200/20000, or 10 ms.

In a preferred embodiment, the maximum packet size for each tag is 200 bits and is preprogrammed at the time of manufacture. Packet size for a particular transmission is determined by the data being requested by the interrogation command sent by the reader, e.g., 101. Each tag is programmed to transmit during a fixed number of active cycles (two in a preferred embodiment), followed by a fixed number of passive cycles during which the tag does not transmit (ten in a preferred embodiment). In a preferred embodiment, the tag redundantly transmits the exact same packet during each of the two active cycles. Furthermore, before each of the two active cycles, the tag is silent for a randomized number of passive cycles. In a preferred embodiment, the random number is less than or equal to the fixed number of passive cycles. Each reader transmits back acknowledgments using this same scheme.

As an example, one complete transmission from a tag would include a first random passive portion of, say, 7 cycles; a first fixed active portion of one cycle; a second random passive portion of, say, 4 cycles; a second fixed active portion of one cycle; and a final fixed passive portion of 10 cycles.

A tag that is preparing to transmit will listen for a pattern of two active cycles from another transmitting tag (the transmitting tag being uniquely identified by the ID number it transmits on each active cycle), and will synchronize with such transmitting tag based on the second active cycle transmission (after which that tag is certain to be silent for ten cycles). The tag attempting to commence transmission listens for RF activity from other tags during the final fixed passive 10-cycle period of the tag to which it has synchronized and, based on the amount of detected RF activity, determines whether to (i) transmit its signal during the next fixed passive 10-cycle period which it detects, or (ii) wait for a longer period of time to allow the RF environment to quiet down. In practice, it is found that the likelihood of simultaneous transmissions from multiple tags is significantly reduced by this technique.

By synchronizing on the non-random passive cycles of a transmitting tag, each tag attempting transmission can then determine how many of the ten passive cycles, i.e., available time slots, are being used by other tags. For instance, if the tag detects RF activity during eight of the ten passive cycles, that indicates a very crowded RF environment. In such event, the tag may determine not to initiate transmission since it is highly probable that such transmission would take place at the same time as transmission from another tag and might therefore not be properly received by a reader, e.g., 101. In that case, the tag will continue to identify a series of two active cycles from some transmitting tag and determine the relative RF activity during the following 10 passive cycles until the amount of activity has reached some threshold value where transmission by the listening tag would have a sufficient possibility of successful transmission. In a preferred embodiment, this threshold is based on no RF activity being detected for at least five of the ten passive cycles. Also in a preferred embodiment, the threshold is based not on a single 10-cycle period but on a rolling average of several such periods.

Once a sufficiently quiet RF environment is detected, the tag wishing to transmit begins transmission of its message during one of the cycles of an ensuing ten passive cycle period, choosing at random one of the particular ten cycles for commencement of transmission. As previously described, the tag then waits a random number of passive cycles (in the preferred embodiment between one and ten) before its second active cycle, and then is silent for a fixed duration of ten more cycles.

Thus, with reference again to FIG. 3, based on the observed passive/active RF environment, the tag randomly selects 309 time slots for transmission and waits 310 for that selected time slot. At the allotted time, the tag transmits 311 a packet of data (using the two active cycles described above) and checks 312 for an acknowledgment signal from the reader indicating that the data packet was received. If so, a check 312 is made to see whether there are additional packets to transmit, in which case processing returns to 307 to enable such transmission as described above. If the acknowledgment signal is not received, processing returns to 310 so that the current packet may be retransmitted at the next available time slot. After all of the packets have been successfully transmitted, processing returns to 306 and the tag is put back in the quiescent low-power stand-by state.

In a preferred embodiment, system 100 can tolerate slight overlaps of transmissions causing interference at the beginning or end of a data packet transmission. A number of hashing bits are installed at the beginning and end of each packet to verify data is received accurately and to possibly allow in some embodiments for data reconstruction in the event an overlap occurs. The first and last bits generally have a 2 to 5 times greater pulse width than a normal bit and transmission overlap will then usually only impact the first several bits. The hashing bits allow the reader unit to substitute bits until the hashing bit agrees with the input. Final error checking occurs using other more conventional error correction techniques, including CRC error coding. CRC error coding is employed so that intermittent, lost, or invalid bits, due to noise or collision in the transmission channel that were reconstructed, can be re-verified.

In a preferred embodiment, the most robust signal transmission techniques are applied to the tag ID number, so that even if other data transmitted by the tag are lost, computer 110 can recognize that a particular tag was trying to send data and another request for transmission by only that tag may be made from one of the readers when the RF activity quiets down. This includes the installation of the hashing bit algorithms as described above, except with greater frequency.

In practice, it is found that use of these techniques provides effective data transmission with as low as 7 dbm differentiation between colliding signals. Since an acknowledged signal is not retransmitted, the stronger tags in the near field (i.e., those closer to the reader) complete their transmissions quickly, leaving a quieter RF environment for more distant tags in the far field to respond. By eliminating the strongest signals early on, and randomizing the time slot selection for weaker signals, it is found that a large number of tags may be detected in a relatively short time period and with relatively small bandwidth requirements.

Each reader 101–103 operates both individually and in concert with the other readers 101–103 and computer 110. Each reader 101–103 is assigned a unique ID number by the application's software or as burned in at time of manufacture. The tag activation/wakeup signal consists of a short pulse with this reader ID number. In a preferred embodiment, such pulse will be, on the order of 8 ms in duration, but the duration will depend on the number of bits required to uniquely specify the reader ID number and may be longer than 8 ms if a large number of readers, each with a unique ID number, are used. In one embodiment, transmission of the reader ID number is followed by tag-specific polling information. The tags, e.g., 151, as part of the transmission packet, will also transmit back this reader ID number as confirmation that it is responding to a particular reader in case the signal is received by some other adjacent reader unit.

In the event an adjacent reader unit receives data intended for another reader, the data is in one embodiment retained, an acknowledgment issued to the tag and the other reader contacted to verify the tag information is received. The activating reader then acknowledges receipt of the tag data to the receiving reader and either rejects the data or maintains it for later disposition to the computer 110.

The protocol described herein provides a very effective mechanism for reducing RF traffic and allows far field tags to respond separately without being forced to wait for available far field time slots. In addition, repetitive attempts are significantly reduced, thus saving bandwidth.

Figure 7:
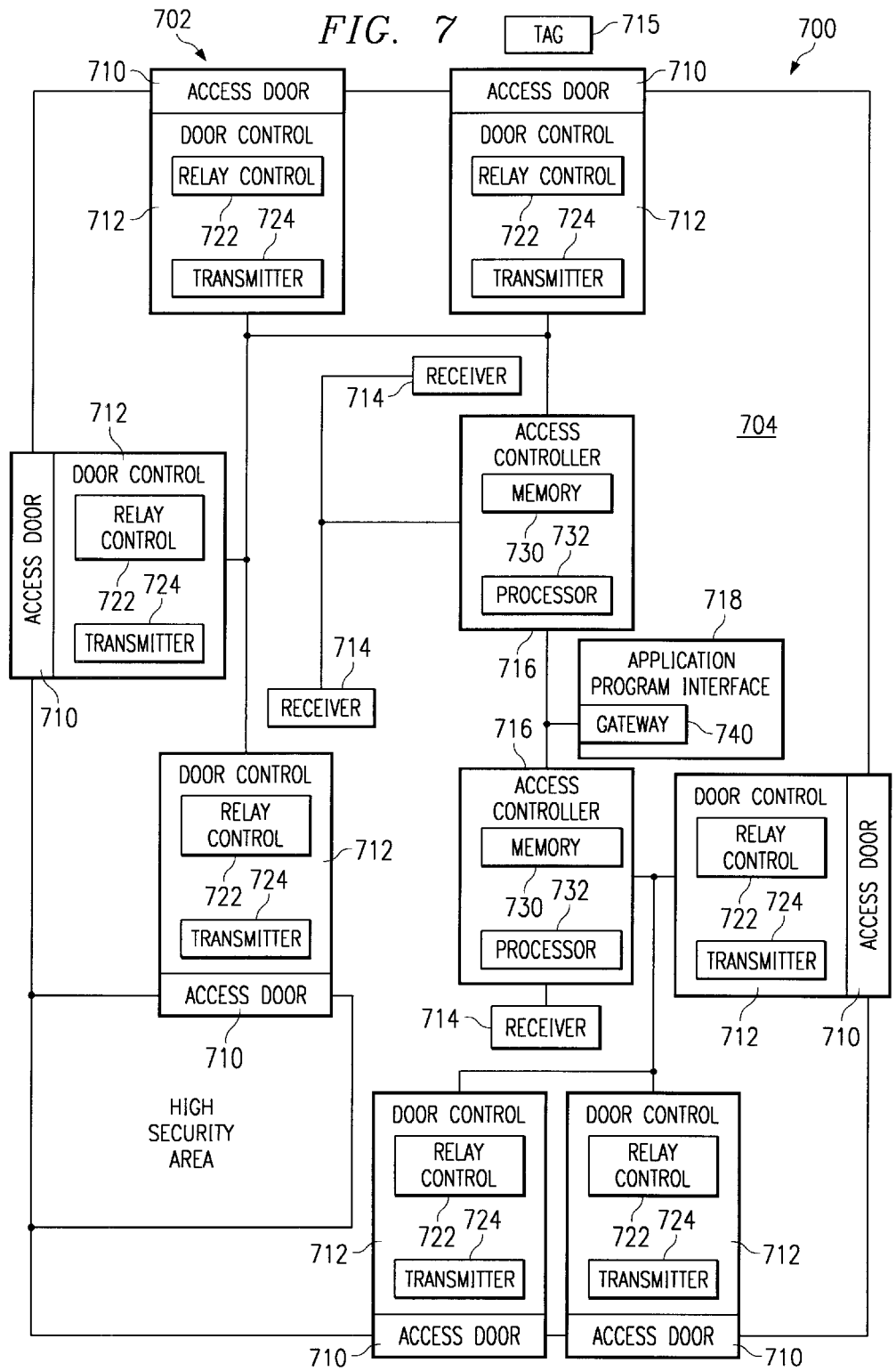
FIG. 7 is a block diagram illustrating a distributed tag reader system in accordance with one embodiment of the present invention.

FIG. 7 illustrates a distributed tag reader system 700 in accordance with one embodiment of the present invention. In this embodiment, the tag reader system 700 is an access control system 702 for a secure facility 704 or other structure. It will be understood that the tag reader system 700 may be used to restrict, control, or otherwise monitor the movement or location of objects.

Referring to FIG. 7, the access control system 702 includes a plurality of access doors 710, a door control system 712 associated with each access door 710, a plurality of receivers 714 distributed throughout the secure facility 704 for communicating with tags 715 at the access doors 710, a plurality of access controllers 716 distributed within the secure facility 704 for determining whether requested access is authorized, and an application program interface 718. The access doors 710 may be external access doors for controlling access to the secure facility 704 or internal access doors for controlling access to high security or other spaces within the secure facility 704. For example, the secure facility 704 may divided into work areas with each worker only being allowed access to their particular area. Managers may be allowed access to their particular area as well as administrative and other areas that they visit in the normal performance of their duties. Access includes entry into and exit from the facility 704 or space within the facility 704.

Each door control system 712 is associated with an access door 710. In one embodiment, the door control system 712 is located at the access door 710. The door control system 712 includes a relay control 722 and a transmitter 724. As used herein, each means each of at least a subset of the identified items.

The relay control 722 operates the access door 710. The relay control may be any type of device capable of locking and unlocking an access door 710. The relay control 722 is actuated by the access controller 716 based on information obtained from the receiver 714 to permit or deny access into or from the secure facility 704. In addition, the relay control 722 may sound a local alarm at the access door 710 or even lock an external door to trap the individual attempting unauthorized or illegal entry into the secure facility 704.

The transmitter 724 is a conventional short range transmitter or other suitable transmitter capable of eliciting a radio frequency (RF) response from a tag 715 at the associated access door 710. The transmitter 724 transmits a wake up, or activation, signal to tags 715 within close proximity to the access door 710. The transmitter 724 may continually transmit the activation signal or may only transmit the activation signal in response to a suitable event such as the presence of a person at the access door 710. The transmitter 724 transmits an access door ID with the activation signal. As described in more detail below, the access door ID allows a receiver 714 shared by a plurality of access doors 710 to distinguish between tag 715 responses from the different doors 710. The access door ID is any suitable type of identifier capable of distinguishing between access doors 710.

The tags 715 are conventional battery operated tags and may be worn by an individual or attached to equipment, inventory, or other suitable items. The tag 715 wakes up in response to the activation signal and emits a response. The response includes a tag ID identifying the tag and the access door ID identifying the access door 710. In one embodiment, the tag ID uniquely identifies the tag 715. In another embodiment, a type or class of tag 715 may be identified.

The receivers 714 are distributed throughout the secure facility 704 to communicate with tags 715 at the access doors 710. Each receiver 714 may be a conventional receiver having a range of about 50 feet. The receivers 714 are remote from each other but may overlap in range to provide redundant, or backup, processing. The receivers 714 are remote from the access doors 710 and door control system 712 in order to receive a process signal for tags 715 at a plurality of access doors 710. Accordingly, each access door 710 need not have its own receiver 714 and cost of the access control system 703 is reduced. The number of access doors 710 that share a common receiver 714 will depend on the spacing of access doors 710 from each other and the range of the receiver 714.

The access controllers 716 are distributed within the secure facility 704 and are coupled to one or more receivers 714 and door control system 712 associated with those receivers 714. The access controllers 716 may be remote from each other and the receivers 714. The access controllers 716 are each coupled to their associated receivers 714 and their associated door control systems 712 by twisted pair cabling, a local network, wireless communication, or other suitable link.

Each access controller 716 receives and processes information from the receivers 714 to control access to secure facility 704. The information forwarded by the receivers 714 include the tag ID and the access door ID. The access controller 716 includes a memory module 730 and a network processor 732 to process the information and determine whether requested access is authorized.

The memory module 730 stores tag ID and other information to allow the access controller 716 to determine whether a tag 715 at an access door 710 is allowed to access through that door 710. In one embodiment, the memory module 730 includes a listing of all tag IDs 715 permitted to enter the access doors 710 controlled by the access controller 716 and the particular doors 710 through which each of the listed tag IDs 715 are allowed access.

The network processor 732 receives tag and access door ID information forwarded by the receiver 714 and accesses the memory module 730 to determine whether the tag 715 is authorized access through the identified access door 710. As described in more detail below, if access is allowed, the network processor 732 signals the relay control 722 to open the access door 710. If access is not allowed, the network processor 732 will not open the access door 710 and may generate an alarm or take other suitable action. The processor and memory module may be any conventional or other suitable device.

The application program interface 718 provides an interface to an application that logs all transactions performed by the access controllers 716 and may be used to override or manually control the system 702. The application program interface 718 and application may be run on a mainframe, server, personal computer or other suitable device for managing the access control system 702.

The application program interface 718 may be remote from the access controllers 716. The application program interface 718 is coupled to the access controllers 716 by twisted pair cabling, a local network, wireless communication, or other suitable link. In a particular embodiment, the application program interface 718 communicates with the distributed network via a network gateway 740, such as a serial wiegand reader communications module.

Distribution of the access controllers 716, and further distribution of the receivers 714, allow access to the secure facility 704 to be efficiently controlled. In addition, the receivers 714 and/or access controllers 716 may overlap coverage areas and thus provide redundant processing in the event of a failure of one component. In this way, each access door 710 need not include a stand alone access control system. In addition, each access door 710 need not be separately wired to a central control system. Rather, each access door 710 is locally controlled to the extent possible and receiver and controller function are shared by disparate doors 710 for efficiency. It will be understood that the memory, network processor, and other modules and functions of the system 702 may be otherwise distributed within the access control system 702. For example, each receiver 714 may have its own memory and network processor 730 and 732, eliminating the need for separate access controllers 716. Conversely, decision making functions may be handled only through the application program interface 718 in which case the receivers 714 directly communicate with the application program interface 718.

The door control systems 712, receivers 714, access controllers 716, and application program interface 718 may each comprise a miniature network essentially providing a means for parallel processing of different or even similar tasks. In this embodiment, each component or module within a unit is configured to operate independently of the other, so each component or module can be subtracted or added in multiples and other such modules can be added to provide additional capabilities. Communications between units are performed using a specific processor that is directly connected to other units via any type of conventional connection (e.g., RF, power line, twisted pair cabling, or other type of media) and routes pertinent information to the appropriate internal unit process. Each module in a unit may include a microcontroller, a functional circuit providing the specific function of the module, and a media access circuit providing communication with the other components within the unit. In addition to providing full system flexibility, each module of each available unit can be shared with other unit, either to save cost or to provide fault tolerance to the network.

FIG. 8 is a flow diagram illustrating a method for controlling access to a facility in accordance with one embodiment of the present invention. In this embodiment, the receivers 714 are shared by a plurality of access doors 710. In addition, one or more receivers 714 share an access controller 716. The receivers 714 and the access controllers 716 are distributed throughout the facility as dictated by efficiency concerns.

Referring to FIG. 8, the method begins at step 800 in which the transmitter 724 transmits an activation signal in the proximity of an access door 710. The activation signal includes an access door ID that can be received and retransmitted by a tag 715 along with the tag ID. Inclusion of the access door ID allows the system 702 to determine the access door 710 at which the tag 715 is attempting to gain access. The activation signal may be continuously transmitted by the transmitter 724 or in response to detection of an object at the access door 710.

Proceeding to step 802, the tag 715 receives the activation signal, wakes up, and transmits a response. The response includes the tag ID and the access door ID. Next, at step 804, the receiver 714 proving coverage for the access door 710, receives the response from the tag 715. At step 806, the tag ID and access door ID are forwarded by the receiver 714 to the access controller 716 for processing.

Next, at decisional step 810, the access controller 716 determines whether access is authorized. This determination may be made by the network processor 732 by accessing the memory module 730 to determine whether the identified access door 710 is authorized for the identified tag 715. If access is permitted, the Yes branch of decisional step 810 leads to step 812. At step 812, the access controller 716 transmits an open signal to the relay control 722 for the identified access door 710. Next, at step 814, the access door 710 is opened, or released, by the relay control 722. In this way, the individual or item bearing the tag 715 is permitted entry or exit through the access door 710. At step 816, the application program interface 718 is notified of the transaction. Accordingly, all traffic into and out of the secured facility 704 is controlled and may be logged.

Returning to decisional step 810, if access is not permitted, then access is denied and the access door 710 is not opened. The No branch of decisional step 810 leads to step 816. As previously described, the application program interface 718 is notified of this transaction. Accordingly, unauthorized attempts to enter the secured facility 704 may be logged. Step 816 leads to the end of the process by which access to the facility 704 is controlled.

Although the present invention with several embodiments, various changes and modifications may be suggested to one skilled in the art, it is intended that the present invention encompass such changes and modifications as fall within the scope of the appended claims.

What is claimed is:

1. An access control system, comprising:
a plurality of door control systems each associated with at least one of a plurality of access doors and comprising a relay control for operating the access door and a transmitter for eliciting a radio response from a tag at the access door, the response including a tag ID and an access door ID, a plurality of the access doors associated with a facility;
a receiver operable to receive radio responses from tags at a plurality of the access doors; and
an access controller coupled to the receiver and operable to receive the tag ID and the access door ID included in each radio response received by the receiver, to determine whether access by the tag at the access door is authorized, and to control the relay control to permit authorized access.

2. The access control system of claim 1, further comprising the access controller coupled to a plurality of receivers, the receivers remote from each other and each operable to receive radio responses from tags at a plurality of the access doors.

3. The access control system of claim 1, further comprising a plurality of access controllers, the access controllers remote from each other and each coupled to at least one receiver and operable to receive the tag ID and the access door ID included in each radio response received by the receiver, to determine whether access by the tag at the access door is authorized, and to control the relay control to permit authorized access.

4. The access control system of claim 1, further comprising a plurality of access controllers, the access controllers remote from each other and each coupled to a plurality of receivers and operable to receive the tag ID and the access door ID included in each radio response received by the receivers, to determine whether access by the tag at the access door is authorized, and to control the relay control to permit authorized access.

5. The access control system of claim 3, further comprising an application program interface coupled to the access controllers to log actions by the access controllers.

6. The access control system of claim 1, the access controller further comprising:
a memory module operable to store information identifying tags and authorized access doors for the tags; and
a network processor operable to access the memory module to determine whether access by a tag at an access door is authorized.

7. The access control system of claim 1, wherein the tag is authorized entry at only a portion of the access doors.

8. The access control system of claim 1, wherein each door control system is disposed at an access door.

9. The access control system of claim 1, wherein the receiver is remote from the door control systems.

10. The access control system of claim 2, wherein the access controller is remote from the receivers.

11. The access control system of claim 5, wherein the application program interface is remote from the access controllers.

12. The access control system of claim 2, wherein at least two of the receivers are operable to receive radio responses from tags at a same access door.

13. The access control system of claim 1, wherein the transmitter is operable to communicate an activation signal containing the access door ID to the tag.

14. The access control system of claim 13, wherein the transmitter is operable to continously communicate the activation signal.

15. A secure facility, comprising:
a plurality of access doors in the secure facility for accessing at least one of the facility and one or more areas within the facility;
a door control system associated with each of the access doors and comprising a relay control for operating the access door and a transmitter for eliciting a radio response from a tag at the access door, the response including a tag ID and an access door ID;

a receiver operable to receive radio responses from tags at a plurality of the access doors; and an access controller coupled to the receiver and operable to receive the tag ID and the access door ID included in each radio response received by the receiver, to determine whether access by the tag at the access door is authorized, and to control the relay control to permit authorized access.

16. The secure facility of claim 15, further comprising the access controller coupled to a plurality of receivers, the receivers remote from each other and each operable to receive radio responses from tags at a plurality of the access doors.

17. The secure facility of claim 15, further comprising a plurality of access controllers, the access controllers remote from each other and each coupled to at least one receiver and operable to receive the tag ID and the access door ID included in each radio response received by the receiver, to determine whether access by the tag at the access door is authorized, and to control the relay control to permit authorized access.

18. The secure facility of claim 17, further comprising an application program interface coupled to the access controllers to log actions by the access controllers.

19. The secure facility of claim 18, wherein each door control system is disposed at an access door, the receivers are remote from the door control systems, the access controllers are remote from the receivers, and the application program interface is remote from the access controllers.

20. The secure facility of claim 15, wherein the transmitter is operable to communicate an activation signal containing the access door ID to the tag.

21. The secure facility of claim 18, wherein the transmitter is operable to continously communicate the activation signal.

22. A method for controlling access to a facility, comprising:

eliciting a first radio response from a first tag at a first access door in the facility, the first response including a first tag ID and a first access door ID;

eliciting a second radio response from a second tag at a second access door in the facility, the second response including a second tag ID and a second access door ID;

receiving the first and second radio responses from the first and second tags at a shared receiver;

determining whether access by the first tag at the first access door is authorized based at least partially on the first response;

determining whether access by the second tag at the second access door is authorized based at least partially on the second response; and controlling the access doors to permit authorized access.

23. The method of claim 22, wherein the shared receiver is a first shared receiver, further comprising:

eliciting a third radio response from a third tag at a third access door, the third radio response including a third tag ID and a third access door ID;

eliciting a fourth radio response from a fourth tag at a fourth access door, the fourth response including a fourth tag ID and a fourth access door ID;

receiving the third and fourth radio responses from the third and fourth tags at a second shared receiver;

receiving at a shared access controller the tag ID and the access door ID included in each radio response;

determining for each response whether access by the tag at the access door is authorized; and controlling the access doors to permit authorized access.

24. The method of claim 23, further comprising logging actions taken by the access controller through an application program interface.

25. The method of claim 22, further comprising communicating an activation signal containing the first access door ID to the first tag.

26. The method of claim 25, wherein communicating the activation signal comprises continuosly communicating the activation signal.

* * * * *